Feb. 12, 1963

J. K. BROWN 3,077,245

ENGAGEMENT MECHANISM

Filed April 5, 1960

INVENTOR.
JOHN K. BROWN

BY

Edward M. Farrell

ATTORNEY

United States Patent Office 3,077,245
Patented Feb. 12, 1963

3,077,245
ENGAGEMENT MECHANISM

John K. Brown, Sharon Hill, Pa., assignor to Sperry Rand Corporation, New York, N.Y., a corporation of Delaware Filed Apr. 5, 1960, Ser. No. 20,057
8 Claims. (Cl. 188—42)

This invention relates to a mechanical system for positioning a magnetic head over a selected portion of a magnetic drum, and more particularly to an engaging mechanism for connecting a movable carriage to a position rack.

The use of magnetic drums for storage devices is well known. Such magnetic drums generally include mass storage of data in the form of magnetized areas on the surface of the drums comprising binary coded signals. A portion of drum's surface which passes beneath a magnetic reading or writing head is called a track. A single magnetic drum may include as many as one thousand or more tracks. In order to attain fast random access to the stored information as well as in the interest of economy, it is often desirable to use a single magnetic head for reading or writing information on one of a number of tracks on a drum. When a single head is used for reading or writing information on a number of tracks, it is necessary to move magnetic head to precisely positon it over a selected track before the reading or writing operation is commenced.

The present invention relates to a positioning system in which the fine positioning of the magnetic head over a particular selected track includes a notched bar or rack extending along the length of carriage travel. The distance between two teeth or notches of the rack may correspond to the distance occupied by a predetermined number of tracks, for example ten, on the magnetic drum. Coarse or rough positioning of the magnetic head to an area between two selected teeth of the rack is first achieved by moving the head carrying carriage, which carries the magnetic head, to the desired sector by suitable means, for example, by the use of a cable and pulley arrangement. When the carriage is roughly positioned, the rack, adapted to be moved a number of discrete distances corresponding to the number of tracks in a tooth sector, provides a fine positioning of the carriage. The rack is responsive to be moved to an exact position by a coded signal and the carriage is moved to engage one of the teeth of the rack to position the magnetic head over the selected track on the drum.

In the aforementioned system, rough positioning of the carriage may be first obtained by causing a pawl mechanism to drop within a selected sector between a pair of teeth in the rack, with the fine positioning being attained by movement of the rack to a desired position, and then causing the pawl mechanism to engage one of the teeth of the rack. It is necessary that the pawl mechanism provided permit free relative movement between the carriage and rack except during the actual positioning operation. It is also desirable that the dropping of the pawl mechanism between two selected teeth to provide rough positioning of the carriage be accomplished by relatively simple, reliable and inexpensive means.

It is an object of this invention to provide a novel retractable engagement mechanism for mechanically connecting two elements.

It is a further object of this invention to provide a retractable engagement mechanism for positioning a carriage member by means of a toothed positioning rack.

It is still a further object of this invention to provide a retractable engagement mechanism for positioning a carriage member which is relatively simple, inexpensive and reliable.

It is still a further object of this invention to provide an improved retractable engagement mechanism which will be automatically retracted in the event of power failure.

In accordance with the present invention, a retractable engagement mechanism for connecting a movable carriage to a toothed rack is provided. The engagement mechanism is pivotally mounted to the carriage and a biasing member is connected thereto to normally maintain it disengaged from the rack. A second biasing member is providing to force the engagement mechanism into engagement with the rack when the second biasing member is actuated by a electrically operative device.

Other objects and advantages of the present invention will be apparent and suggest themselves to those skilled in the art, from a reading of the following specification and claims in conjunction with the accompanying drawing, in which:

Figure 1:
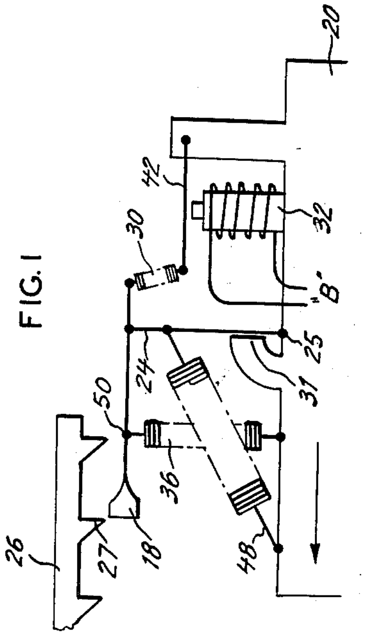
FIGURE 1 is a simplified line type diagram illustrating the general features of the present invention.

Referring particularly to FIGURE 1, a solenoid 32, adapted to be actuated by an electrical signal through lead wires "B", is in the unenergized condition. A pawl arm 18 is pivotally mounted intermediate its two ends to a carriage 20 through a link member 24 and is held in a retracted position away from a toothed positioning rack 26 by suitable biasing means such as a spring member 36. The spring member 36 is connected between the free end of the pawl arm and the link 24.

When an electrical signal is applied to the solenoid 32, and element 42, pivotally mounted to a protruding portion of the carriage 20, is actuated to produce tension in a spring member 30, which is connected to the opposite end of the engaging or free end of the pawl arm. The tension produced by the spring member 30 by the solenoid 32 is sufficient to overcome the tension produced by the spring member 36. The pawl arm 18 is therefore rotated about its pivot point 38 to cause the pawl arm to become extended and disposed to engage one of the teeth 27 of the rack 26.

During the initial positioning operation when the pawl arm 18 seeks to engage one of the teeth of the rack 26, the carriage 20 and the rack 26 are often moving with respect to each other. If the direction of the carriage movement is to the left when the pawl arm engages one of the teeth, the link member 24 will rotate about its pivot point 25 in a clockwise direction. A dampening spring 48, angularly connected between the link member 24 and the carriage 20, becomes extended until the relative motion between the carriage and the rack ceases. Normally, the spring 48 forces the link member 24 against a stop member 31 which forms part of the carriage assembly. The link member is normally held at right angles to the carriage 20 but is angularly moved when the pawl arm engages one of the teeth of the rack, accidentally or otherwise, when relative movement between the rack and carriage is present.

It is noted that the pawl arm 18 is normally retracted away from the rack 26 when the solenoid 32 is de-energized. Thus, in the event of power failure in the system during operation, the pawl arm 18 will be automatically retracted away from the rack thereby minimizing the likelihood of damage to various parts in the system as a result of power failure.

Figure 2:
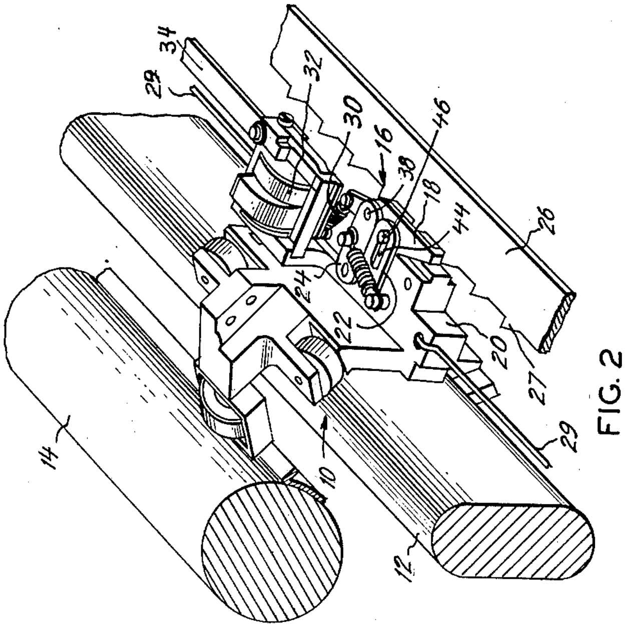
FIGURE 2 is an isometric view illustrating a magnetic head positioning system embodying the engagement mechanism of the present invention; and, FIGURE 3 is an enlarged side view of an engaging mechanism, in accordance with the present invention.

Referring particularly to FIGURE 2, an embodiment of a major portion of a positioning system utilizing an engagement mechanism as described in FIGURE 1 is shown. A carriage mechanism 10 includes a plurality of rollers adapted to ride on a rail element 12. In practice, the carriage mechanism 10 normally includes various magnetic head members which are adapted to be lowered over a selected track of a magnetic drum by means of the actuation of a bail element or lowering tube 14. Since the present invention is directed to a retractable mechanism associated with the positioning system, the magnetic head elements and drum mechanism and other details relating thereto are not illustrated.

A pawl mechanism 16 includes the pawl arm 18 pivotally mounted to the carriage 20 through a pair of link members 22 and 24. When the carriage mechanism 10 traverses lengthwise along the rail element 12, the free end of the pawl arm 18 is held by the spring 36 (FIGURES 1 and 3) in a retracted position away from the positioning rack 26. The link member 22 includes an elongated slot 44. A pin 46 is attached to the pawl arm 18 and disposed to be moved within the slot 44 when the pawl arm 18 is being extended or retracted.

The positioning rack 26 includes a plurality of equally spaced teeth 27. The carriage mechanism 10 is driven by a drive cable 29 which may be connected to be moved in accordance with an electrically coded signal to position the carriage mechanism 10 to a selected area between two of the teeth of the positioning rack 26. The distance between two teeth of the rack may correspond to the distance occupied by a predetermined number of information tracks, for example 10 or 20, on a magnetic drum. Thus, a first coded signal may be employed to roughly position the carriage mechanism 10.

When the carriage mechanism 10 is roughly positioned between the desired two teeth of the rack 26, the pawl arm 18 is caused to be extended and drops in the area between the two selected teeth of the rack and disposed to engage one of the teeth of the rack. Dropping of the pawl arm 18 is achieved by means of the tension spring 30 actuated by the solenoid 32. The solenoid 32 becomes operative when an electrical signal is applied thereto.

After the rough positioning of the carriage mechanism 10, the fine positioning is achieved by positioning the rack 26 which is adapted to be moved a predetermined number of discrete distances dependent upon the number of information tracks on a portion of the magnetic drum. The movement of the rack 26 may be effected by means responsive to an electrical coded signal. When the rack 26 is precisely positioned, a servo mechanism (not shown) may be employed to move the drive cable 29 to force the pawl mechanism 16 to be moved to the left until the pawl arm 18 physically contacts one of the teeth of the rack 26. At this point, the carriage mechanism is properly positioned so that a magnetic head may be lowered into position over a particular selected track to perform a reading or writing operation.

The hand 34 may be connected to a position potentiometer for indicating the actual position of the carriage during operation. Since this feature is not important to the present invention, it is not shown or described in detail.

Figure 3:
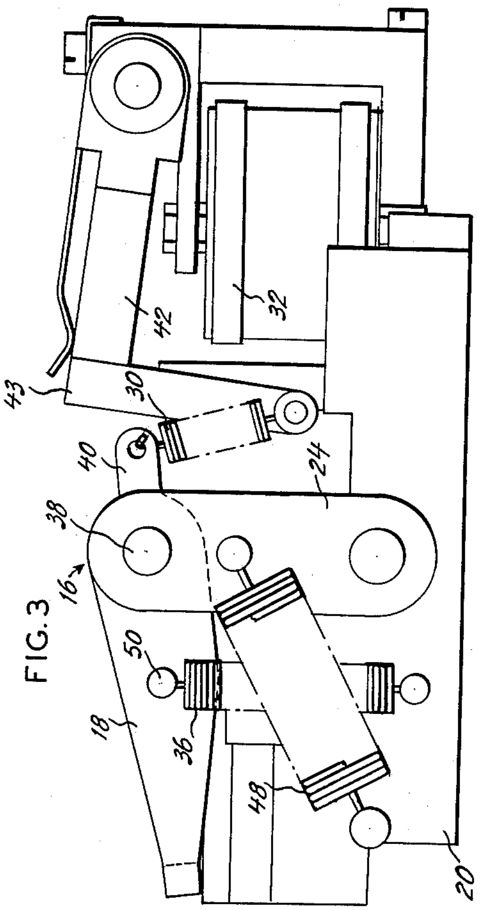

Referring particularly to FIGURE 3, the pawl mechanism 16 is illustrated with its pawl arm 18 in a retracted position. The spring member 36 is suitably connected between the central portion of the pawl arm 18 and the carriage element 20. The spring member 36 is normally under tension to hold the pawl arm in a retracted position away from the rack 26. The pawl arm 18 is pivotally mounted to the link member 24 at a pivot point 38. One end or extended portion 40 of the pawl arm 18 is connected to the spring 30. The element 42 is connected between the spring 30 and an arm 43 of the solenoid 32. When the solenoid 32 is actuated by an electrical signal, the arm 43 and the element 42 are forced to be moved in a downward direction. The downward movement of the element 42 causes tension in the spring 30 which pulls down the extended portion 40 of the pawl arm 18. The tension produced by the spring 30 is sufficient to overcome the tension produced by the spring 36 which holds the pawl arm 18 in a retracted position when the solenoid 32 is not actuated. When the solenoid 32 is actuated, the pawl arm 18 rotates to an extended position about its pivot point 38. It is noted that the link member 22 with its elongated slot 44 (FIGURE 2) is adapted to receive the pin member 46 which makes it possible for the pawl arm 18 to be extended or retracted about its pivot point 38.

It is seen that the spring member 36 provides a means for maintaining the pawl arm 18 in a retracted position when the carriage mechanism is being rapidly moved in the direction of the rack as when a particular track is being sought. The spring member 30 provides means for causing the pawl arm 18 to become extended as when the carriage mechanism is roughly positioned. The operations of the springs 30 and 36 are substantially independent of the movement of the link 22 (FIGURE 2) and its associated parts. The third spring 48 provides means for resiliently maintaining the link member 24 substantially perpendicular to the carriage 20.

The link member 22 and its associated parts provide a protective feature which involves an invention not specifically claimed in this application. This feature is claimed in a copending patent application of Herbert F. Welsh entitled "Protective Mechanism," Serial Number 39,406, filed on June 28, 1960. Referring again to FIGURE 2, it is seen that the pawl arm 18 is in an extended position and physically engages one of the teeth 27 of the rack 26. Assume now that the rack 26 is moving to the right with respect to the carriage element 20. If this movement exceeds a predetermined limit, the movement of the rack 26 drives the pawl arm 18 to the right and the links 22 and 24 are moved in a clockwise direction. The link 22, which is designed to disengage the pawl arm from the rack 26, is shorter than the link 24. Because it is shorter than the link 24, the link 22 moves through a greater angle than the link 24 when both are moved by the pawl arm 18.

Continued movement of the rack 26 to the right finally causes the pawl arm 18 to be completely retracted from the area between the teeth of the rack 26. In its disengaged or "toggled out" position, further movement of the rack 26 will not affect the carriage element 20.

The spring 48 and the spring 30 urge the pawl arm 18 into engagement again with the rack 26 after it has passed over one of the teeth in the rack. It is thus seen that any excess relative motion between the rack 26 and the carriage element 20, when the pawl arm 18 is extended, will cause the pawl arm to be retracted.

It is noted that if the rack 26 is moved to the left, the pawl arm 18 will ride over the sloped portion of the toothed rack and is automatically retracted, since the pin 46 will move down the slot 44. It is therefore seen that regardless of the direction of movement of the rack with respect to the carriage, the protective feature provided by the link 22 and its associated elements is effected.

The resilient type of engaging arrangement provided by the retractable pawl mechanism, it is seen, minimizes the possibility of damage to the pawl arm 18 or to the rack 26 as a result of excessive relative motion therebetween. This excessive motion may occur especially at two critical times, such as when the pawl arm 18 is coming into position with the rack 26 or when the pawl arm is leaving the rack 26. At these times, the rack and carriage element may be moving in opposite directions.

The entire system may be designed so that the pawl arm 18 will not become retracted until the relative motion between the rack 26 and the carriage 20 is beyond some predetermined limit. This is important since, as was noted, the final position of the pawl arm 18 may be determined by the operation of a servo system attached to the band 34 which will move the pawl arm 18 against one of the notches of the rack 26 for fine positioning of the carriage 20.

It is noted that the link member 24 may actually be in the form of an H frame member with a spring, such as the spring 48, being connected to both sides of the frame member. The spring 36 may be connected to a pin 50 and centrally spaced between the pawl arm 18.

What is claimed is:

1. A transducer positioning system comprising a movable carriage and a rack, said carriage being physically free of said rack to permit high speed movement, an engagement mechanism attached to said carriage, means for actuating said engagement mechanism to maintain said engagement mechanism disengaged from said rack during a positioning operation, and means operative by an electrical signal to actuate said engagement mechanism to engage said rack toward the end of said positioning operation.

2. A transducer positioning system comprising a movable carriage and a rack, said carriage being physically free of said rack to permit high speed movement, a retractable engagement mechanism attached to said carriage, a first means providing tension to urge said engagement mechanism to be retracted from said rack during a positioning operation, a second means providing tension to urge said engagement mechanism into engagement with said rack when said second means is actuated, and an electrically operative device disposed to actuate said second means to produce tension therein sufficient to overcome the tension produced by said first means toward the end of said positioning operation.

3. A transducer positioning system comprising a movable carriage and a toothed rack, said carriage being physically free of said rack to permit high speed movement, a pawl arm pivotally attached to said carriage, a spring member providing tension to urge said pawl arm about a pivot point to disengage said rack during a positioning operation, means providing tension to urge said pawl arm about its pivot point to cause said pawl arm to engage said rack when said means is actuated, and a device responsive to an electrical signal connected to actuate said means to produce tension therein sufficient to overcome the tension produced by said spring member toward the end of said positioning operation.

4. An electrical transducer positioning system comprising a movable carriage and a toothed rack, said carriage being physically free of said rack to permit high speed movement, a pawl arm pivotally attached to said carriage, a first spring member providing tension to urge said pawl arm about its pivot point to disengage said rack during a positioning operation, a second spring member providing tension to urge said pawl arm about its pivot point to cause said pawl arm to engage said rack when said second spring member is actuated, and a solenoid operative by an electrical signal connected to actuate said second spring member to produce tension therein sufficient to overcome the tension produced by said first spring member toward the end of said positioning operation.

5. An electrical transducer positioning system comprising a movable carriage and a toothed positioning rack, said carriage being physically free of said rack to permit high speed movement, a retractable pawl arm pivotally attached to said carriage, a first spring member for urging said pawl arm about its pivot point to cause said pawl arm to be retracted away from the teeth of said positioning rack during a positioning operation, a second spring member for urging said pawl arm about its pivot point to cause said pawl arm to become extended to engage one of the teeth of said positioning rack, and a solenoid operative by an electrical signal connected to actuate said second spring member to produce tension therein sufficient to overcome the tension produced by said first spring member to urge said pawl arm into engagement with one of the teeth of said positioning rack when said solenoid is operated toward the end of said positioning operation.

6. An electrical transducer positioning system comprising a movable carriage and a toothed positioning rack, said carriage being physically free of said rack to permit high speed movement, a pawl arm, a link member pivotally attached between said pawl arm and said carriage, a first spring member connected between said pawl arm and said carriage for producing tension to urge said pawl arm about its pivot point to disengage the teeth of said positioning rack during a positioning operation, a second spring member connected between said pawl arm and said carriage for producing tension to urge said pawl arm about its pivot point to cause said pawl arm to engage said positioning rack when said second spring member is actuated, and a solenoid operative by an electrical signal connected to actuate said second spring member to produce tension therein sufficient to overcome the tension produced by said first spring member to urge said pawl arm into engagement with one of the teeth of said positioning rack when said solenoid is operated toward the end of said positioning operation.

7. A magnetic head positioning system comprising a movable carriage, a toothed positioning rack, said carriage being physically free of said rack to permit high speed movement, a retractable pawl arm, a link member pivotally connecting said pawl arm and said carriage, a first spring member connected between said pawl arm and said carriage for producing tension to urge said pawl arm about its pivot point to be retracted away from the teeth of said positioning rack during a positioning operation, a second spring member connecting said pawl arm and said carriage for producing tension to urge said pawl arm about its pivot point to cause said pawl arm to be extended to engage said positioning rack when said second spring member is actuated, and a solenoid operative by an electrical signal connected to actuate said second spring member to produce tension therein sufficient to overcome the tension produced by said first spring member toward the end of said positioning operation.

8. In combination with a movable carriage and a toothed positioning rack, a pawl arm, a link member pivotally connecting said pawl arm and said carriage, a first spring member connected between said pawl arm and said carriage for producing tension to urge said pawl arm about its pivot point to disengage the teeth of said positioning rack, a second spring member connected between said pawl arm and said carriage for producing tension to urge said pawl arm about its pivot point to cause said pawl arm to engage said positioning rack when said second spring member is actuated, a solenoid operative by an electrical signal connected to actuate said second spring member to produce tension therein sufficient to overcome the tension produced by said first spring member to urge said pawl arm into engagement with one of the teeth of said positioning rack, a stop member mounted to said movable carriage, and a third spring member connected between said link member and said carriage for maintaining said link member against said stop member and substantially perpendicular to said carriage.

References Cited in the file of this patent

UNITED STATES PATENTS

| | | |
|---|---|---|
| 1,658,192 | Hampton | Feb. 7, 1928 |
| 2,254,115 | Claytor | Aug. 26, 1941 |
| 2,674,728 | Patter | Apr. 6, 1954 |